March 24, 1970 W. W. LOGAN 3,503,057

TWO COLUMN MAGNETIC TRANSDUCER

Filed Feb. 10, 1967 2 Sheets-Sheet 1

INVENTOR
WILLIAM W. LOGAN

George H. Fritzinger

BY AGENT

March 24, 1970 W. W. LOGAN 3,503,057

TWO COLUMN MAGNETIC TRANSDUCER

Filed Feb. 10, 1967 2 Sheets-Sheet 2

INVENTOR
WILLIAM W. LOGAN

BY George H. Fritzinger
AGENT

United States Patent Office 3,503,057
Patented Mar. 24, 1970

3,503,057
TWO COLUMN MAGNETIC TRANSDUCER
William W. Logan, Glen Ridge, N.J., assignor to McGraw-Edison Company, Elgin, Ill., a corporation of Delaware
Filed Feb. 10, 1967, Ser. No. 615,202
Int. Cl. G11b *21/04, 21/08, 3/88*
U.S. Cl. 340—174.1 7 Claims

ABSTRACT OF THE DISCLOSURE

A magnetic drum with two transducers is utilized to record data. Each transducer cooperates with a portion of drum so that the drum is effectively divided into two columns. The transducers move in a direction parallel to the axis of rotation of the drum.

This invention relates to improved recording and/or reproducing machines of the type adapted for recording and reproducing lists of items such as addresses, telephone numbers, etc.

The machine is provided with a writing medium which is moved to bring successive lines in registration with a writing slot respectively as the translating head is brought into registration with respective tracks on the record medium. This enables the user to write in a column the names of the persons, companies, agencies, schools, etc., whose addresses, telephone numbers, etc. are recorded in respective tracks on the record medium. Preferably, a transverse magnetic machine is employed wherein the translating head is driven crosswise with respect to a magnetic drum or tape and the writing medium is a drum or tape shifted in correspondence with the track selector movements of the record medium.

In a typical commercial use of the present machine, the information recorded on the record medium is in a code form suitable for operating a teletypewriter. For instance, teletypewriters are operated from punched tapes wherein each line on the tape has one or a combination of holes spaced according to a binary code to represent respective characters to be typed. In this code system a hole represents a marking signal and a no-hole represents a spacing signal. The combinations of marking and spacing signals representing the respective characters can be recorded serially along a track of a magnetic record medium in terms of successive groups of magnetic bits wherein the magnetic bits of each group are arranged in the same spatial relationship as are the respective marking signals.

Alternatively, the magnetic medium may be recorded on a basis wherein it is magnetized in one direction to represent a marking signal, in the other direction to represent a spacing signal, and the magnetization is continuous and is shifted only when going from a marking to a spacing signal, and vice versa.

Since a high density is achieved when the information is recorded in code form it is found that on a record medium of five inch width, the usual entry (i.e., address, telephone number, etc.) for each name written on the writing medium requires only half of the length of each track across the record medium. In order to make full utilization of this fact and provide a machine having twice the entry capacity of the usual machine, the invention comprehends the use of two translating heads in the machine separated by half the length of the respective tracks, in providing two columns for names on the writing medium and in providing two start-stop controls one of which operates also to connect the amplifier to one translating head and the other also to connect the amplifier to the other head. Further, the invention comprehends the use of start controls of a shape and location which identifies them with the respective writing columns so that the user will naturally press the control which connects the translating head in circuit corresponding to the correct column when he starts the machine.

It is accordingly an object of the invention to provide improvements in a list recording and/or reproducing machine which enables the machine to have a double entry capacity.

These and other objects and features of the invention will be apparent from the following description and the appended claims.

In the description of my invention, reference is had to the accompanying drawings, of which:

The machine according to the present invention may be operable for recording and/or reproducing, but once a list of items is recorded on the record medium the machine is then used repeatedly only for reproducing the selected items until need for changing the list occurs. By way of illustrative example, the machine is herein described only as a reproducing machine. Further, to simplify the description, both the record and writing media are shown in drum form.

Figure 1:
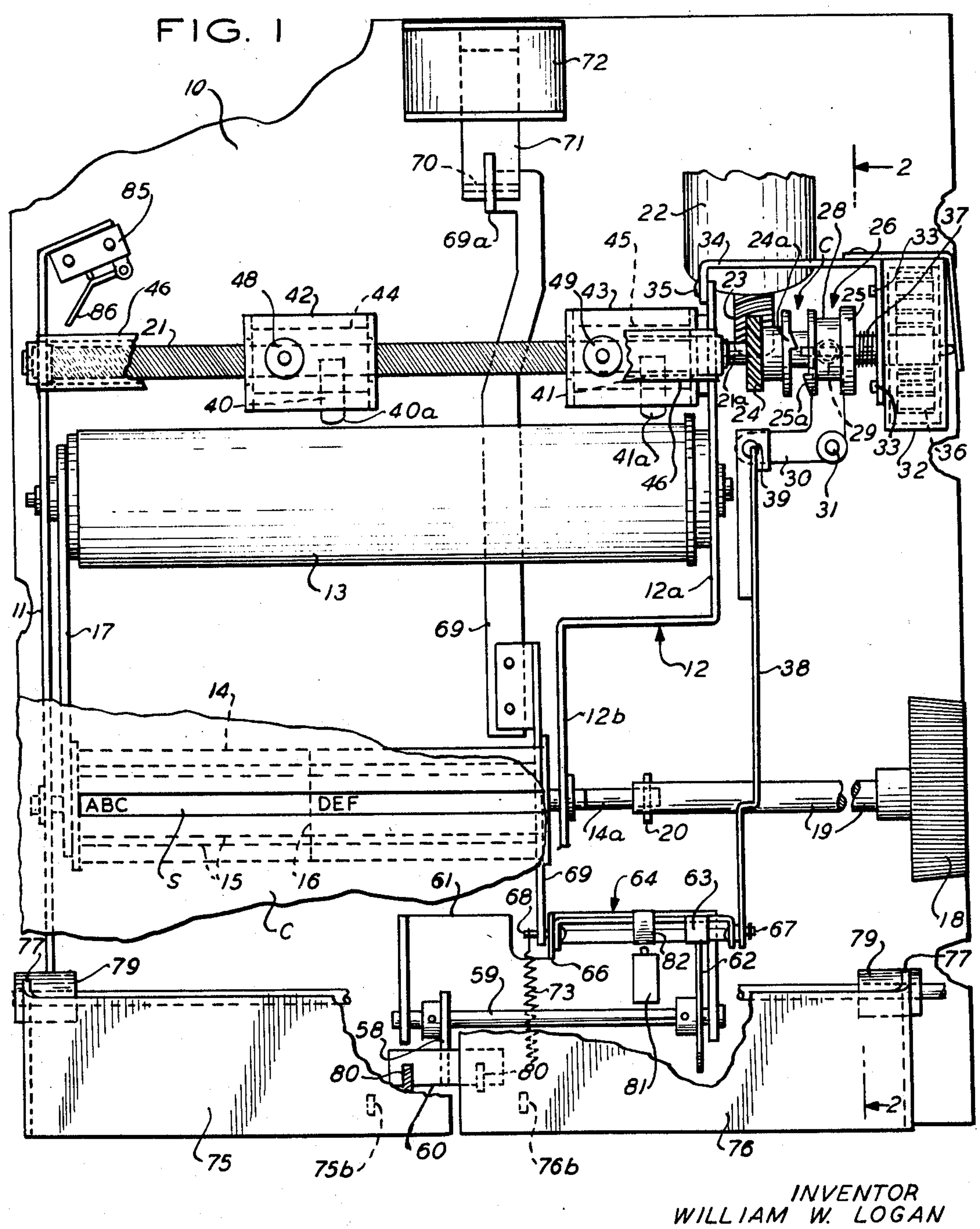
FIGURE 1 is a fractional plan view of a recording-reproducing machine with the top cover removed showing an operating mechanism according to the invention.

The machine is provided with a base plate 10 (fractionally shown) on which is mounted an upright frame plate 11 along its left edge and an upright frame member 12 comprising a rearward plate section **12*a* inset from the right edge of the base plate and a forward plate section 12*b* offset leftwardly from the rearward section (FIGURE 1). Journaled between a rearward portion of the frame plate 11 and the rearward plate section 12*a* is a record drum 13 having a magnetic recording surface. Journaled between the forward portion of the frame plate 11 and the forward plate section 12*b* is a writing drum 14 having a writing surface provided with cross lines 15 and with a central circumferential line 16 constituting a columnar dividing line separating the writing surface into two columns. A cover C of the machine (only fractionally indicated) is provided with a writing slot S extending along the top of the writing drum. The record and writing drums may have the same diameter, and may be intercoupled as by a timing belt 17 to maintain them in synchronism with each other so that a rotational shift in the writing drum to advance the drum by one line with respect to the writing slot will likewise advance the record drum by one track to the next, as will appear. Manual shifting of the two drums is produced by turning a knob 18 having a shaft 19 which telescopically engages an end portion of the shaft 14*a* of the writing drum and is connected thereto by a cross pin 20**.

Journaled between the frame plate 11 and plate section **12*a* to the rear of the magnetic drum 13 is a feed screw 21. This feed screw is driven by a motor 22 through a worm 23 on the motor shaft and coopearting gear 24 journaled on a reduced diameter shaft 21*a* of the feed screw. Splined to the shaft 21*a* beyond the gear 24 is a clutch member 25 of a clutch 26. The clutch member 25 has a single tooth 25*a* which is engageable with a tooth 24***a* on an end face of the gear 24. In the clutch member 25 is a peripheral groove 28 engaged at the bottom by a pin 29 staked to the end of a bell crank lever 30. The lever 30 is pivoted at its "knee" as at 31 to the base plate 10. Beyond the clutch member 25 is a cylindrical housing 32 centered on the shaft 21*a* and secured by screws 33 to a bracket 34 in turn secured by screws 35 to the rear frame plate section 12*a*. In the housing 32 is a clock spring 36 secured at its outer end to the circumferential wall of the housing and at its inner end to the shaft 21*a*. Located between the end wall of the bracket 34 and the clutch member 25 is a compression spring 37 which urges the clutch member into engagement with the gear 24. The clutch 26 is however normally held disengaged by a start control mechanism at the front of the machine through a link 38 pivoted at 39 to the outer end of the bell crank lever 30.

At the back of the record drum 13 there are two record-reproduce magnetic type translating heads 40 and 41 respectively having pole members 40*a* and 41*a* engageable with the record drum. These heads are mounted on the cross members of respective inverted U-shaped carriages 42 and 43. Staked between the lower end portions of the U-shaped carriages 42 and 43 are respective cylindrical feed nuts 44 and 45. The feed screw 21 is threaded through these nuts but at a spacing between the heads equal approximately to half the length of the record drum 13—which is by half the width of the circumferential recording surface of the drum. This spacing is maintained permanently during the operation of the machine since the feed nuts are never disengaged from the feed screw.

Straddling the rear portions of the frame plates 11 and 12*a* from the top is a bail 46 pivoted thereto at 47. The cross member of this bail is in the form of a channel-shaped bar 46*a* extending midway across the head carriages 42 and 43. Journaled on the head carriages are rollers 48 and 49 which are received by the channel bar 46*a*. Connected between an ear 50 on the bail and a pin 51 on the frame plate 12*a* is a tension spring 52 which urges the bail forwardly to bias the two heads 40 and 41 into engagement with the record drum.

Figure 2:
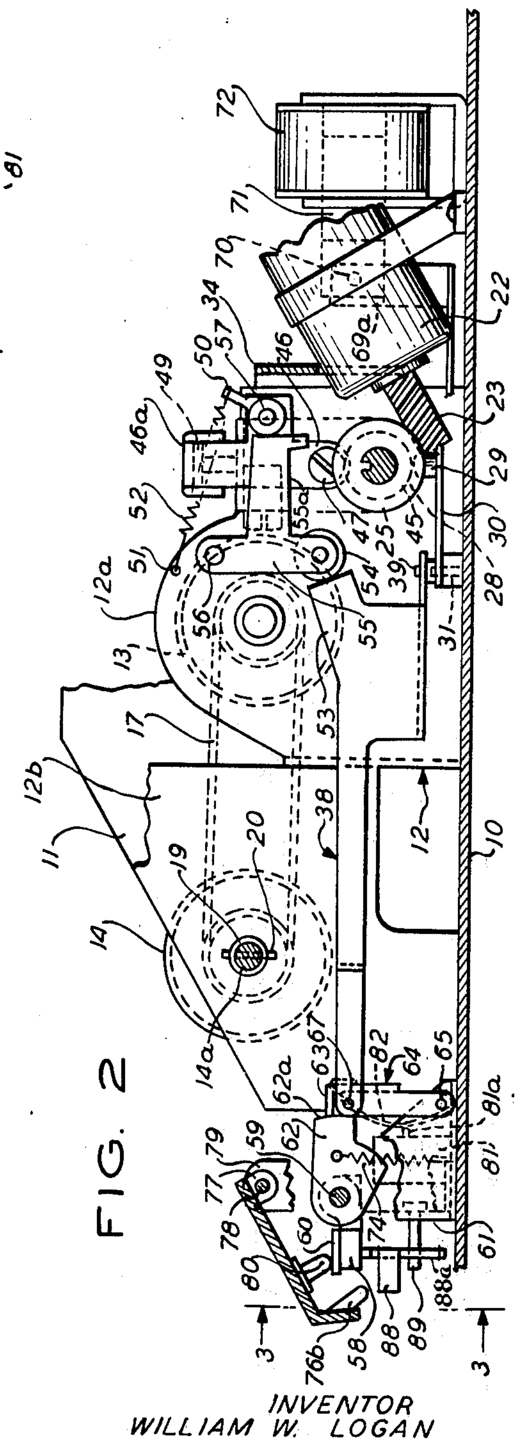
FIGURE 2 is a vertical sectional view taken on the line 2—2 of FIGURE 1.

As is shown in FIGURE 2, the link 38 has an upwardly extending arm 53 at its rearward end which is pressed rearwardly against a roller 54 journaled on the lower end of an intermediate lever 55. The lever 55 is located between the link 38 and bail 46, and is pivoted at its upper end on a stud 56 staked to the frame plate section 12*a*. The lever 55 has a rearwardly extending arm 55*a* which bears against a roller 57 journaled on the bail 46. When the link 38 is detented in a rearward position to hold the clutch 26 disengaged, the intermediate lever 55 is held in a counterclockwise position to cause the arm 55*a* to bear against the roller 57 and hold the bail 46 in a rearward position against the force of the spring 52. By this rearward positioning of the bail both of the translating heads 40 and 41 are held disengaged from the record drum and also the clutch 26 is held disengaged. Further, when the clutch 26 is so held disengaged, the clock spring 36 holds the feed screw 21 in a clockwise position (as seen in FIGURE 2) causing the head carriage 43 to be pressed rightwardly against the inner side of the frame plate section 12*a* as a stop.

Upon pulling the link 38 forwardly the clutch 26 is engaged by the spring 37 and the translating heads 40 and 41 are engaged with the record drum 13. As the motor 22 runs it drives the feed screw 21 counterclockwise to move the heads in unison at a constant speed in a leftward direction along the record drum and at the same time the clock spring 36 is wound up. When the link 38 is next pressed rearwardly to disengage the clutch 26 and to lift the heads from the record drum, the clock spring propels the feed screw in a clockwise direction to return instantly the heads 40 and 41 to their start positions shown in FIGURE 1.

The manual start control mechanism at the front of the machine comprises a depressible start lever 58 which is pinned to a cross shaft 59 and provided with a transverse top plate 60. The shaft 59 is journalled at its end portions in upright legs of a U bracket 61 secured to the base plate 10. Pinned also to the shaft 59 is a rearwardly extending latch 62 which coacts with a lug 63 turned over from the cross member of a bail-shaped rocker 64 having left and right depending legs pivoted on a cross pin 65. The pin 65 is supported at its right end in the right leg of the bracket 61 and at its left end in a lug 66 turned up from an intermediate portion of the bracket 61. The right end of the rocker 64 is pivotally connected at 67 to the link 38, and the left end of the rocker is pivotally connected at 68 to a link 69 which extends downwardly and rearwardly along the base plate 10 to the back part of the machine. At its rearward end the link 69 has an upright arm 69*a* pivotally connected by a cross pin 70 to an armature 71 of a reset or stop solenoid 72. A tension spring 73 connected to the rocker 64 biases it in a forward direction to aid the spring 37 in engaging the clutch 26. When the solenoid 72 is activated to draw the rocker 64 rearwardly it disengages the cluth 26 and it disengages the translating heads 40 and 41 from the record drum 13; also, at the same time the latch 62 is shifted clockwise by a tension spring 74 (FIGURE 2) into a latching position wherein an arcuate end face 62*a* thereof abuts against the lug 63 to hold the clutch 26 disengaged and the heads 40 and 41 away from the drum 13 after the solenoid 72 is deactivated. When the clutch 26 is thus disengaged the heads 40 and 41 are returned to their start position as before described, leaving the machine in a start condition ready for a next operation.

At the front of the machine are two manual start bars 75 and 76 mounted end-to-end and extending the width of the machine as indicated in FIGURE 1. These start bars have depending apertured ears 77 at their rearward edges which are received by a cross rod 78 carried at its ends in brackets 79 mounted on the base plate 10. The start bars have depending bosses 80 near their adjacent ends which rest on the cross plate 60 under the weight of the bars. When either start bar is depressed the latch 62 is turned counterclockwise to disengage it from the lug 63 and allow the rocker 64 to be shifted forwardly by the springs 73, 52 and 37 whereby to engage the clutch 26 and to bring the translating heads 40 and 41 into engagement with the record drum. As the end face 62*a* is moved off the lug 63 the latter snaps below the latch to lock it in an operated position in which it is retained until the stop solenoid 72 is again activated. Since the latch is locked in operated position, whichever start bar has been depressed will remain in an operated position until the machine is stopped by the activation of the stop solenoid 72.

Figure 5:
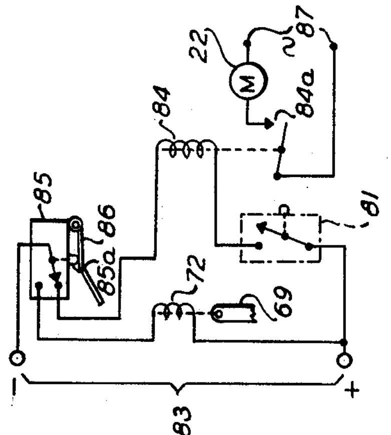
FIGURE 5 is a simplified schematic diagram of the control circuits of the machine.
Figure 4:
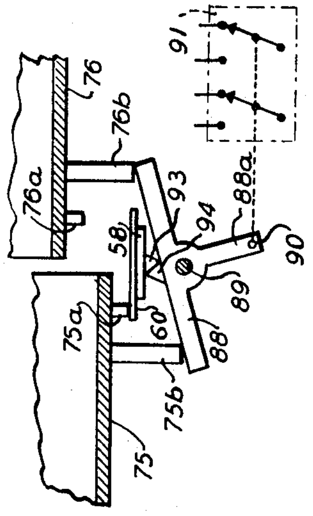
FIGURE 4 is a fractional view of the apparatus of FIGURE 3 showing the positioning of parts when one of the start controls is depressed.
Figure 3:
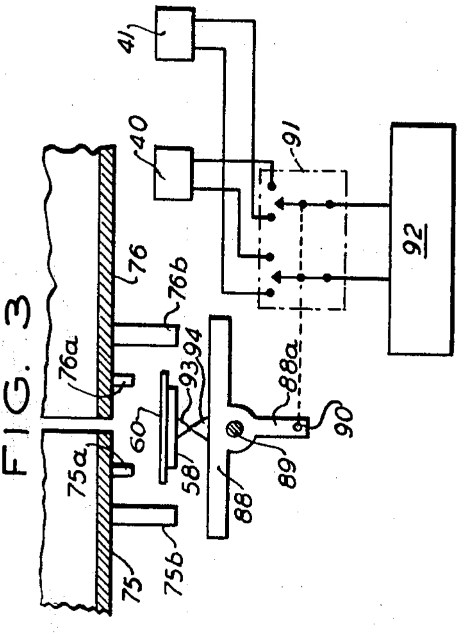
FIGURE 3 is a view partly sectional on the line 3—3 of FIGURE 2 and partly diagrammatic to show the head selector switching.

Mounted on the bracket 61 at the front of the rocker 64 is a microswitch 81 having a push button 81*a* operable by a bowed arm 82 secured to the rocker. As the rocker is moved forwardly to engage the clutch the switch 81 is closed to connect a D.C. source 83 via a motor relay 84 and an end switch 85 as is shown in FIGURE 5. The end switch is of the single-pole double-throw micro type having a push button 85*a* operable by a lever 86. This end switch is mounted on the side frame plate 11 (FIGURE 1) in position to cause the head carriage 42 to engage the lever 86 and to operate the switch when the head carriage reaches the end of its travel. An activation of the motor relay closes a switch 84*a* to connect the drive motor 22 to an A.C. power source 87. When the head carriage 42 is driven to the end of its travel it operates the end switch 85 to drop the motor relay 84 and stop the motor, and thereupon to connect the reset solenoid 72 to the D.C. source 83 whereby to activate this solenoid and reset the machine.

Operable also by the start bars 75 and 76 via depending fingers 75*b* and 76*b* thereon is a rocker bar 88 pivoted to the frame at 89. This rocker bar has a depending arm 88*a* coupled as indicated at 90 to a double-pole double-throw switch 91. When the left start bar is pressed the switch 91 is thrown to connect an amplifier 92 to the left translating head 40, and when the right start bar is depressed the switch 91 is thrown to connect the amplifier to the right translating head 41. Thus the left half portion of each track on the record drum is reproduced with reference to a name written in the left column of the writing slot S when the left start bar is depressed, and the right half of the track is reproduced with reference to a name written in the right column of the writing slot S when the right start bar is depressed.

The rocker bar 88 provides an intercoupling between the two manual start bars which is operative to prevent the lever 58 from being depressed sufficiently to start the machine and engage the clutch 26 if both bars are depressed equally. Further, a pair of interlocking lugs 93 and 94 are provided between the start lever 58 and the rocker 88 which coact when the start lever is latched in a depressed position to lock the rocker bar 88 so that it cannot be shifted by pressing the unoperated one of the start bars. By this interlocking action the switch 91 cannot be shifted inadvertently out of operated position by pressure exerted on the non-operated one of the start bars. Instead, only when the machine is stopped and reset by the solenoid 72 can the switch 91 be shifted to its other position.

The embodiment of my invention herein particularly shown and described is intended to be illustrative and not necessarily limitative of my invention since the same is subject to changes and modifications without departure from the scope of my invention, which I endeavor to express according to the following claims.

I claim:

1. In a translating machine: the combination of a record medium having a recording surface of uniform width, means mounting said record medium for shiftable movement in a direction at right angles to its width dimension, a pair of record-cooperable translating heads engaging said record medium and spaced from each other transversely of said record medium by approximately half of the width dimension thereof, drive means for imparting a unitary movement to said heads transversely of said record medium through a distance of one-half the width of the record medium whereby one head describes a track across one-half of the record medium and the other head describes a track across the other half, a pair of manual start controls each operable to start said drive means, a common amplifier for said heads, a head selector switch movable into respective positions to connect said amplifier either to one translating head or to the other, and means connected to said manual start controls for operating said selector switch to one position when one start control is operated and to the other position when the other start control is operated.

2. The machine set forth in claim 1 including a housing having a transverse slot, a writing medium in said housing shiftable past said slot, said writing medium having a columnar division line and successive transverse lines for writing entries on successive lines in two separate left and right columns, and said start controls comprising respective manually depressible left and right bars enabling the start bars to be identifiable respectively with said columns, and shifting means coupled to said record and writing media for causing one to be shifted in correspondence with the other.

3. The machine set forth in claim 1 including interlock means between said start bars preventing both bars from being depressed simultaneously.

4. The machine set forth in claim 1 including means to latch the unoperated one of said manual start controls when the other of said manual start controls is in operated position.

5. The machine set forth in claim 4 including means for unlatching said start controls by the operation of the machine.

6. The machine set forth in claim 1 including means operative to latch said machine in a start condition and said selector switch in operated position when either of said start controls is pressed to operative position.

7. The machine set forth in claim 6 including means operative to release said latch means and to lift said heads from the record medium responsive to an advance of said heads by approximately half the width of the record medium, and means operative upon the release of said latch means for returning said heads in unison to their respective start positions.

References Cited

UNITED STATES PATENTS

| | | | |
|---|---|---|---|
| 2,154,722 | 4/1939 | Bloxsom | 179—6 |
| 2,831,180 | 4/1958 | Hasbrook | 340—174.1 |
| 3,020,355 | 2/1962 | Moriya | 179—100.2 |
| 3,050,596 | 8/1962 | Whitney et al. | 179—100.2 |
| 3,188,559 | 6/1965 | Yungul | 346—44 |
| 3,291,920 | 12/1966 | Hauser | 346—19 |

BERNARD KONICK, Primary Examiner

VINCENT P. CANNEY, Assistant Examiner

U.S. Cl. X.R.

179—100.2; 346—19